US011856486B2

(12) United States Patent
Hoell et al.

(10) Patent No.: US 11,856,486 B2
(45) Date of Patent: Dec. 26, 2023

(54) METHOD FOR LOCATING A FIELD DEVICE WITH A WIRELESS INTERFACE

(71) Applicant: VEGA Grieshaber KG, Wolfach (DE)

(72) Inventors: Ralf Hoell, Titisee-Neustadt (DE); Juan Garcia, Biberach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 17/583,826

(22) Filed: Jan. 25, 2022

(65) Prior Publication Data

US 2022/0240052 A1 Jul. 28, 2022

(30) Foreign Application Priority Data

Jan. 28, 2021 (DE) ...................... 10 2021 101 966.4

(51) Int. Cl.
*H04W 4/029* (2018.01)
*H04B 10/114* (2013.01)
*H04B 10/85* (2013.01)
*H04B 10/077* (2013.01)
*G06T 11/00* (2006.01)

(52) U.S. Cl.
CPC ............. *H04W 4/029* (2018.02); *G06T 11/00* (2013.01); *H04B 10/0775* (2013.01); *H04B 10/1149* (2013.01); *H04B 10/85* (2013.01)

(58) Field of Classification Search
None
See application file for complete search history.

(56) References Cited

U.S. PATENT DOCUMENTS

| | | | |
|---|---|---|---|
| 2008/0310850 A1* | 12/2008 | Pederson | G08B 13/19671 398/135 |
| 2014/0128021 A1* | 5/2014 | Walker | H04W 68/005 455/405 |
| 2015/0147067 A1* | 5/2015 | Ryan | H05B 47/19 398/118 |
| 2019/0033420 A1 | 1/2019 | Knaappila | |

FOREIGN PATENT DOCUMENTS

EP 2 605 099 A2 6/2013

OTHER PUBLICATIONS

German Office Action dated Oct. 12, 2021 in German Patent Application No. 10 2021 101 966.4, citing documents AA and AO therein, 7 pages.

* cited by examiner

*Primary Examiner* — Darren E Wolf
(74) *Attorney, Agent, or Firm* — Oblon, McClelland, Maier & Neustadt, L.L.P.

(57) ABSTRACT

A method for locating a field device having a wireless interface is provided, the method including the following steps: transmitting, from the field device, identification information including distance information and direction information; receiving, by an operator device, the identification information; and displaying, by the operator device, based on the identification information, a distance, and a direction of the field device with respect to the operator device.

19 Claims, 4 Drawing Sheets

METHOD FOR LOCATING A FIELD DEVICE WITH A WIRELESS INTERFACE

CROSS-REFERENCE TO RELATED APPLICATIONS

This application claims the benefit of the filing date of German Patent Application No. 10 2021 101 966.4, filed on 28 Jan. 2021, the entire content of which is incorporated herein by reference.

FIELD

The invention relates to a method for locating a field device, for example within a plant with many field devices, in particular for locating a field device with a wireless interface. Furthermore, the invention relates to a program element, a computer-readable medium, an operating device, a field device and a use.

BACKGROUND

In the field of process and factory automation, field devices are used in many cases, which have sensors, controllers, analyzers or other components, for example. The field devices can have a wireless communication interface. Field devices with wireless communication interfaces are increasingly being used. When a factory or warehouse space—e.g., a factory floor—has a large number of wirelessly communicating field devices, locating a specific field device can become difficult and/or time consuming.

SUMMARY

There may be a desire to provide a method by means of which locating a field device with a wireless interface is at least partially simplified. This desire is met by the subject matter of the independent patent claims. Further embodiments of the present disclosure result from the subclaims and the following description.

One aspect relates to a method for locating a field device having a wireless interface. The method comprises the steps of: transmitting, from the field device, identification information, wherein the identification information includes distance information and direction information; receiving, by means of an operator device, the identification information; and displaying, by means of the operator device, based on the identification information, a distance and a direction of the field device, relative to the operator device.

Such a field device may include, for example, sensors, actuators such as valves or positioners, controllers, control devices, gateways, analyzers, display device(s), and/or other components or devices. The field device may be used, for example, for level measurement, topology determination, level limit determination, flow measurement, pressure measurement, and/or temperature measurement. The sensors may include, for example, impedance limit switches, vibration limit switches, a radio frequency front end, ultrasonic front end, light detection and ranging (LiDAR) or laser front end, and/or a radiometric front end. The field device may have one or more wireless interfaces, e.g., wireless local area network (WLAN), near-field communication such as BLUETOOTH®, wireless personal area network (WPAN), and/or may have other wireless and/or wired interfaces. The method may use technologies to determine the identification information, such as, for example, in the case of BLUETOOTH®, signal strength (RSSI), real-time localization (RTLS), angle of arrival (AoA) information, and/or other techniques.

The field device typically sends the identification information as a broadcast. The identification information contains in particular a distance information and a direction information. In addition, the identification information may include, for example, a serial number of the field device, measuring point name, device type, measured value(s), diagnostic information, and/or other data.

The operator device may be implemented as a mobile device, e.g., a smartphone, tablet, data glasses, smartwatch, laptop, and/or another device that supports the wireless interface of the field device. The operator device may include hardware and/or software components by means of which the determination of the distance and direction of the field device, relative to the operator device, may be simplified, facilitated, made more precise, and/or otherwise improved. The operating device can be set up, for example, for parameterization, diagnostics, measured value display and tracking, validation, control and/or other actions for operating the field device.

Advantageously, this method can at least partially simplify locating a field device with a wireless interface. Furthermore, it can reduce a probability of accidentally accessing a field device other than the desired one. The likelihood of inadvertently accessing an incorrect field device can be reduced when using this method. Such an error can lead not only to a waste of time, but also to malfunctions of the field device, which in at least some cases can even lead to actions that can be dangerous for the field device and/or its environment. Operator safety is thus supported, especially in the case of several similar measuring points or containers.

In some embodiments, the distance and direction of the field device is updated periodically and/or when the operator device is moved. For example, the periodic update may occur every 0.1 seconds to every 10 seconds, such as once per second. The periodic update may be adjustable. The motion of the operator device may be determined, for example, by means of a gyroscope, such as found in at least some mobile devices. This allows an operator to quasi-continuously observe a position of the field device within the fabrication area. The operator may be, for example, a user, a plant operator, a technician, a service technician, and/or another (e.g., authorized) person.

In an embodiment, the wireless interface supports a BLUETOOTH® Angle of Arrival (AoA) protocol, such as specified for BLUETOOTH® 5.1. The AoA specification includes improved distance information and direction information to another device, e.g., the field device, compared to previous BLUETOOTH® versions. This can further simplify and improve the discovery of the field device.

In an embodiment, the wireless interface supports BLUETOOTH® real-time localization—(RTLS) as specified for BLUETOOTH® 5.1, for example. The RTLS specification includes improved distance information and direction information to another device, e.g., the field device, compared to previous BLUETOOTH® versions. This can also further simplify and improve the discovery of the field device.

In some embodiments, the distance and direction—of the field device, relative to the operator interface—is indicated visually and/or audibly. The visual indication may include, for example, an arrow in the direction of the field device and/or a representation of the field device to be located. The arrow and/or the representation of the field device may change depending on the distance, for example in color. For example, the arrow and/or the representation of the field device may be red at farther distances, become orange or yellow at closer distances, etc. The audible indication may include, for example, a tone that changes its tone frequency and/or pulse rate as the field device is approached.

In some embodiments, the distance and direction are combined with a map of the environment, and/or a minimum distance between the field device and the operator device is determined. By combining with a map, an operator orientation within the fabrication area can be improved—for example, by displaying the map on a display of the operator device and marking the position of the operator device on the map. If the map includes a (e.g., vectorized) representation of paths within the fabrication space, the paths between the operator device and the field device can be calculated; in particular, a minimum path between the field device and the operator device can be determined. A combination of displayed map and determination of a (e.g., minimal) path can further improve the guidance to the field device.

In some embodiments, the distance and direction are indicated using a virtual reality (VR) and/or augmented reality (AR) display means. This may be done, for example, by displaying a colored arrow that may be integrated into a representation (VR) or display (AR) of a currently visible portion of the fabrication surface. Furthermore, the field device and/or further field device to be found can be displayed and/or marked in a special way, e.g., by a colored frame.

In some embodiments, the field device further transmits a visual and/or audible signal. This can be particularly advantageous if the field device is close and/or visible to an approaching person.

In some embodiments, the operator interface establishes a communication link with the field device when the distance falls below a predefined distance. For example, the predefined distance may be determined as a fixed setting, e.g., "at a distance of less than 3 m". The predefined distance may be selectable by the operator. Alternatively or additionally, the predefined distance may be associated with further characteristics, e.g., of the field device; for example, the predefined distance may be defined as the distance at which a light signal is visible from the field device or exceeds a certain brightness. This may further be combined with, for example, a time duration for connecting when the position is reached. The automated pairing described here can, on the one hand, reduce the likelihood of selecting the wrong field devices to be operated and, on the other hand, can increase the ease of operation since it is not necessary to explicitly pair manually. This can have a positive impact on the safety of the system. The method can serve to prevent errors, such as when there are several similar measuring points or containers. Furthermore, this feature may help to increase security against unauthorized operation, because physical proximity or presence is required to establish the communication link with the field device.

In addition, the establishment of the communication link can be confirmed with a visual and/or audible acknowledgement signal, e.g., multiple flashes of a (e.g., green) LED on the field device, a sound sequence, and/or a mark or color change on a display of the operator device. The automatic establishment of the communication link is not only a simplification of the operation, but it can also further reduce the probability for an accidental selection of another field device.

In some embodiments, the communication link is established using a secured protocol and/or an optical and/or other signal from the field device. The secure protocol can be implemented, for example, based on keys (private key/public key) on the field device or operator interface. The keys can, for example, be stored on the field device during manufacture and/or communicated to the operating device from a control room. Alternatively or additionally, the authorization may be coupled to an optical and/or other signal from the field device. For example, the field device may send a blinking sequence, and only if this is acknowledged and/or processed by the operator interface, the communication link can be established. Instead of or in addition to a (visual) blinking sequence, a tone sequence can be sent, and/or an electromagnetic signal can be sent, e.g., by means of an RFID on the field device. These measures can make operation of the field device by non-authorized personnel and/or accidental mix-ups much more difficult. In particular, the establishment of the communication link may have a higher level of security because two independent transmission media are used for the establishment.

In some embodiments, the communication link is set up for measured value transmission, control, diagnostics, parameterization, and/or transmission of other data to and from the field device. Advantageously, this allows many aspects of remote control of the field device to be implemented.

In some embodiments, a plurality of field devices each transmit identification information. This may add the following steps to the method: displaying the plurality of field devices, each of which transmits identification information; and selecting, by the operator device, based on the identification information, the field device from the plurality of field devices.

In particular, in cases where a fabrication or storage area—e.g., a factory floor—has a larger number of wirelessly communicating field devices, a sequence of discovery may be preceded by a determination of the (correct) field device to be discovered. For example, a plurality of field devices may be located within the fabrication area. Thus, when an operator enters the fabrication area, the plurality of field devices may each send identification information. Each of the identification information contains in particular a distance information and a direction information. On this basis, the plurality of field devices can be displayed, for example, on the display of the operating device. Depending on which information the identification information still contains, further data of the plurality of field devices can be—displayed, such as a serial number of the field device, a measuring point name, device type, internal device number and/or further data. The data of the field device may also be combined with further data; for example, the human machine interface (HMI) may be connected to a server that holds a lot of detailed data of the field device and sends this data—e.g., based on a query with the serial number of the field device—to the HMI. The multitude of field devices displayed can then be sorted based on, for example, the measuring point name, the device type, the internal device number, etc., and thus be displayed on the display of the operator device. The operator can then select the field device to be found, for example, on the display. Then, for example, the procedure for finding this field device can be carried out.

This eliminates the need for a—possibly time-consuming—search for the selected field device. Furthermore, the probability of an erroneous operation of another field device can be significantly reduced; such an erroneous operation could trigger safety-relevant actions and problems at least in some cases in the past. Also, in cases where the operator wants to be close to the field device to be operated, e.g., to be able to observe resulting effects of the field device from close up, the described finding of a field device can simplify its operation.

One aspect relates to a program element that, when executed on a processor unit of a field device or a user interface as described above and/or below, instructs the processor unit or the field device or the user interface to perform the corresponding steps of the method described herein.

One aspect relates to a computer-readable medium on which the program element described herein is stored.

One aspect relates to an operator device configured to perform the corresponding steps of a method as described above and/or below.

One aspect relates to a use of an operator device as described above and/or below for locating a field device having a wireless interface.

One aspect relates to a field device configured to perform the corresponding steps of a method as described above and/or below.

One aspect relates to a use of a field device as described above and/or below for level measurement, topology determination, level limit determination, flow measurement, pressure measurement, temperature measurement, and/or display of measured values.

It should also be noted that the various embodiments described herein may be combined.

BRIEF DESCRIPTION OF THE FIGURES

For further clarification, the invention is described with reference to embodiments illustrated in the figures. These embodiments are to be understood only as examples and not as limitations.

DETAILED DESCRIPTION OF EMBODIMENTS

Figure 1:
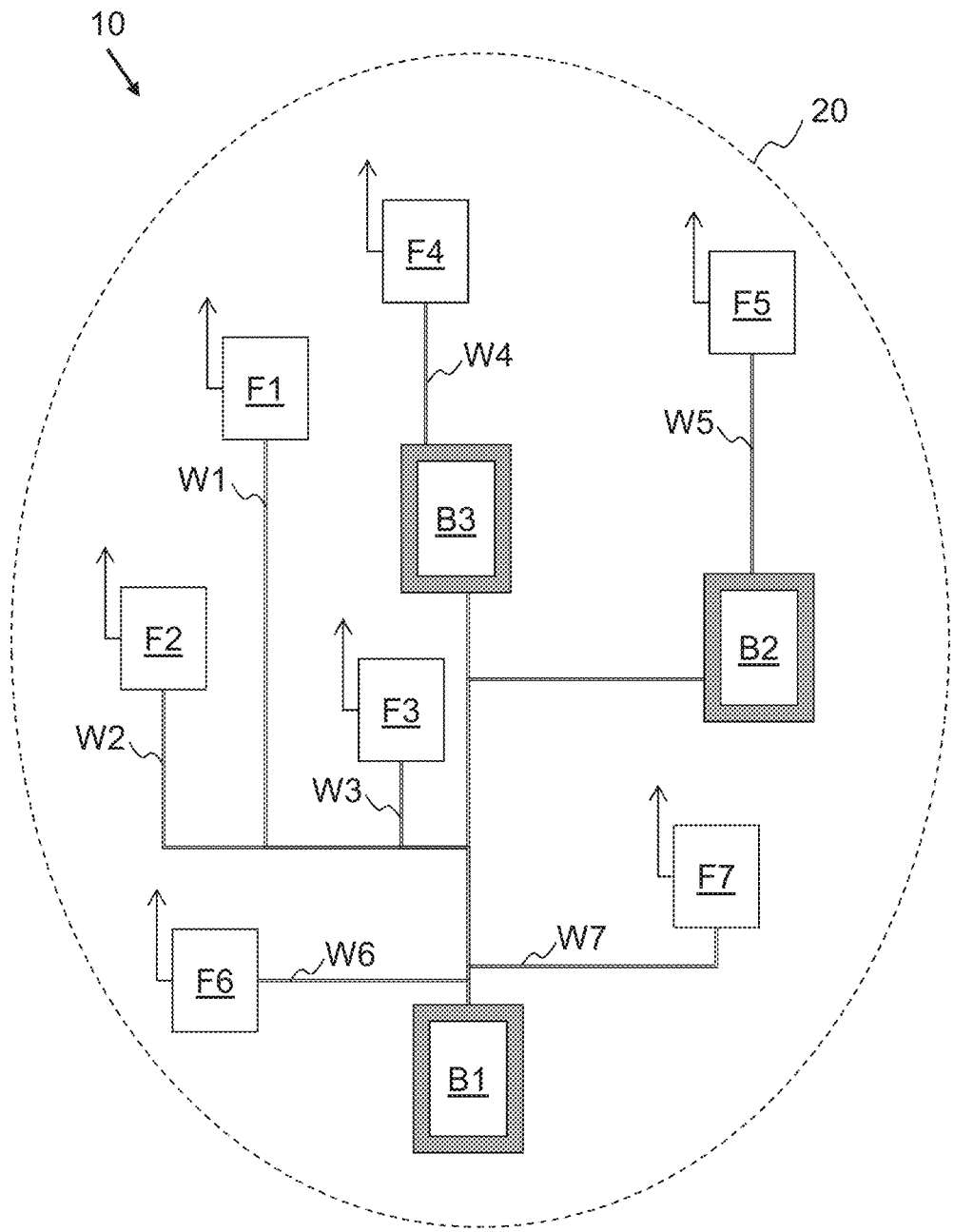
FIG. 1 shows a scenario with a plurality of field devices and operator devices according to an embodiment.

FIG. 1 schematically shows a scenario with a plurality of field devices F1-F7 and operator interfaces B1-B3 according to one embodiment, which are arranged within a fabrication area 10. The field devices F1-F7 and operator devices B1-B3 are located within a radio room 20. The operator devices B1-B3 are operated by operators who are on their way to one field device each. The paths to the respective field devices F1-F7 are designated W1-W7. The paths can be limited, for example, by further devices arranged within the fabrication area 10 and/or by path markings which, for example, should not be left. In the scenario shown, for example, a first operator, with operating device B1, wants to go to field device F1, a second operator, with operating device B2, wants to go to field device F5, and a third operator, with operating device B3, wants to go to field device F4.

Within the radio space 20, each field device transmits, via broadcast, identification information from each of the plurality of field devices F1-F7. The identification information can include a distance information and a direction information, and optionally, e.g., a serial number of the field device, measuring point name, device type, measured value(s), diagnostic information and/or further data. The identification information is received by means of the operator interfaces B1-B3. The operator interfaces B1-B3 can display the field devices F1-F7 on the basis of the identification information. The more details the identification information contains, the more extensive information can be displayed. In one variation, the field devices F1-F7 send only a few details of the identification information, such as its serial number, and further details of the identification information can be obtained from a database—e.g., on the operator device, on a control station, etc.—e.g., with the serial number as database key. By means of the operator interfaces B1, B2, B3, based on the identification information, the respective field device F1, F5, F4 to be found can be selected from the plurality of field devices F1-F7. Then, based on the identification information, the operator interfaces B1, B2, B3 can display a distance and a direction of the respective field device F1, F5, F4. Furthermore, a map of paths W1-W7 within the fabrication area 10 can be underlaid so that the operators of the operator devices B1, B2, B3 can be guided along the paths W1, W5, W4.

Figure 2:
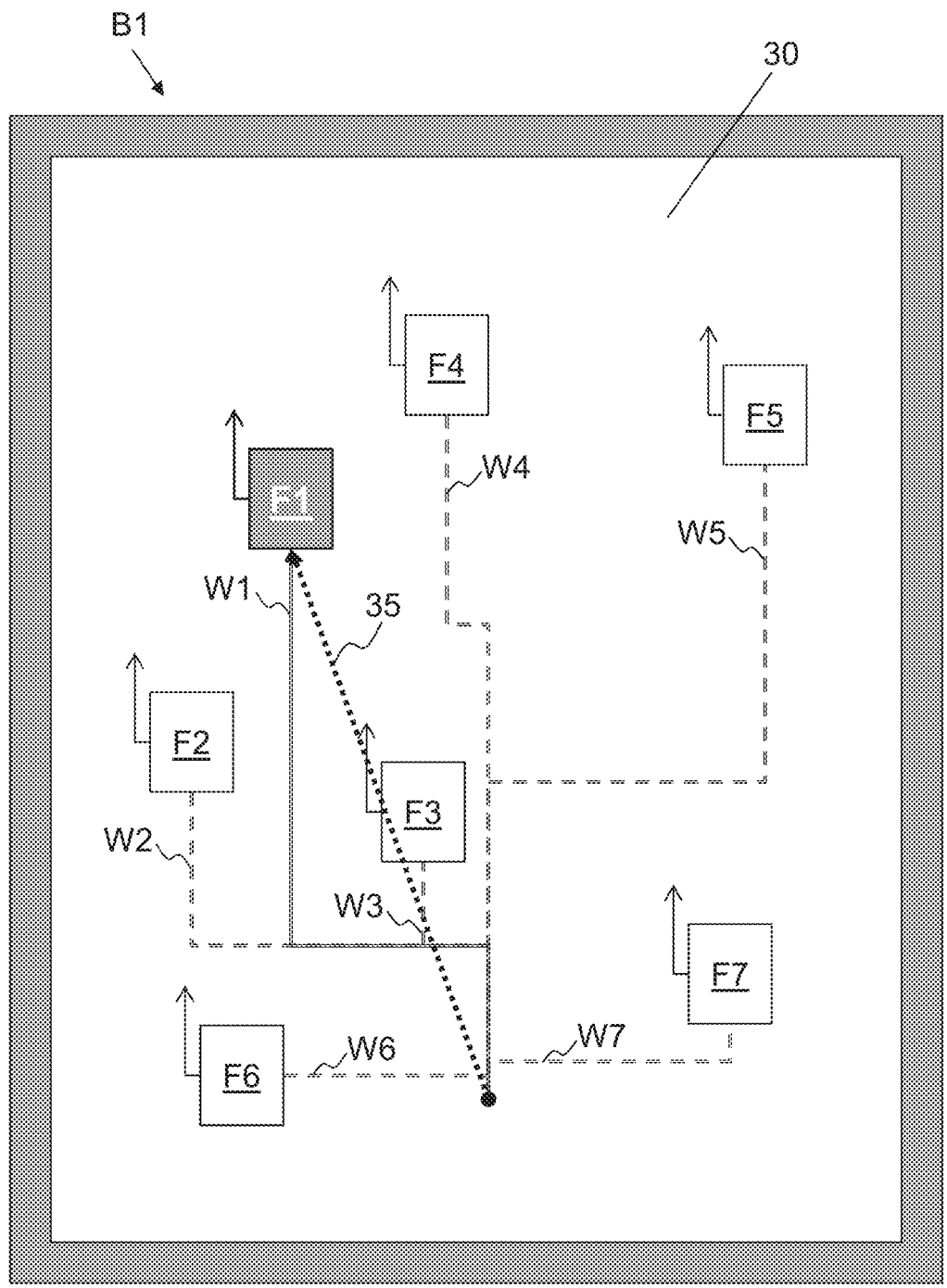
FIG. 2 shows a representation on a display of an operating device according to an embodiment.

FIG. 2 schematically shows a representation as may be shown on a display 30 of the operator device B1 according to an embodiment in a scenario according to FIG. 1. The operator of the operator device B1 sees on the display 30 of the operator device B1 the field device F1 highlighted in color and, based on the identification information, a distance and a direction 35 (shown in dotted lines) of the field device F1, with respect to the operator device B1, which in this representation appears to be located at the bottom center of the display 30. Furthermore, the path W1 is shown along which the operator can reach the field device F1. The other field devices F2-F7 may also be shown, possibly in a less conspicuous representation than the field device F1 to be located. The other paths W2-W7 may also be shown, for example to improve the operator's orientation. In case of a movement of the operator holding device B1 and/or periodically, the distance and the direction 35 of the field device F1—shown in the display 30—can be updated.

Figure 3:
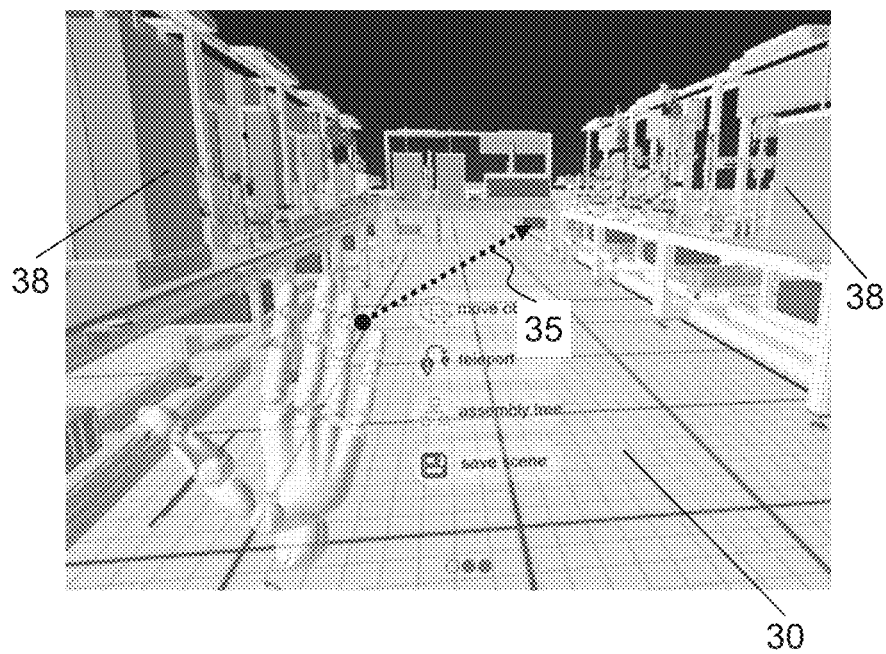
FIG. 3 shows of a further representation on a display of an operating device according to an embodiment.

FIG. 3 schematically shows another representation on a display 30 of an operating device according to one embodiment. Here, a part of a manufacturing area 10 can be shown, where the paths of devices 38 of the production hall are limited. In this embodiment, the distance and the direction 35 are displayed by means of a virtual reality (VR) and/or augmented reality (AR) display medium.

Figure 4:
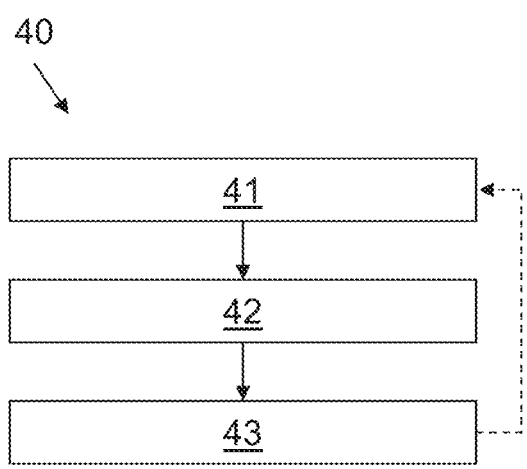
FIG. 4 shows a flowchart of a method according to an embodiment.

FIG. 4 shows a flowchart 40 depicting a method according to one embodiment.

In a step 41, identification information (see FIG. 2 or 3) is sent from a field device F1, the identification information including distance information and direction information 35. In a step 42, by means of an operator device B1, the identification information is received. In a step 43, by means of the operation device B1, a distance and a direction 35 of the field device F1 with respect to the operation device B1 are displayed based on the identification information. For updating the distance and the direction 35, the steps 41 to 43 can be executed several times, in particular periodically.

Figure 5:
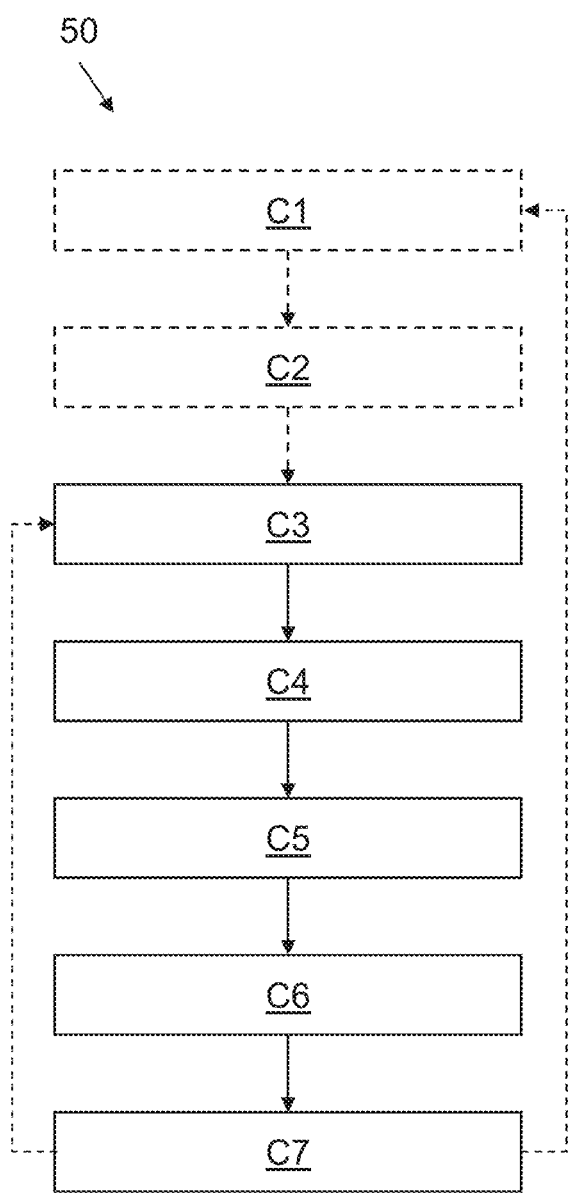
FIG. 5 shows a flowchart of a further method according to an embodiment.

FIG. 5 shows a flowchart depicting a further method 50 according to one embodiment. In an optional step C1, a predefined distance (e.g., in meters) to a field device F1 to be found can be entered. This preset distance is used to ensure that a communication link with the field device F1 can be established if the distance falls below this predefined distance. In an optional step C2, a time duration (in time units, e.g., in seconds) can be determined for automatic connection to the field device F1 to be found after the predefined distance has—been reached.

After these preparations, an operator can enter the fabrication area, e.g., with an operator device B1. a plurality of field devices F1-F7 may be arranged within the fabrication area.

The plurality of field devices may each transmit identification information. Each of the identification information may include, in particular, a distance information and a direction information. On this basis, the plurality of field devices can be displayed, e.g., on the display of the operating device. In a step C3, a specific field device F1 to be found is selected from the plurality of field devices F1-F7 by means of the operating device B1 on the basis of the identification information. This can be done by means of a device search list, which is shown on a display 30 of the operating device B1. In a step C4, a navigation to the field device F1 takes place, e.g., using a navigation aid, e.g., on the HMI B1, which can indicate the distance and a direction 35 of the field device F1, referred to on the HMI B1. Furthermore, the navigation aid can indicate the distance and a direction 35 optically and/or acoustically, e.g., by color change of the field device symbol and/or a certain tone sequence, depending on the distance.

In a step C5, if the distance falls below the predefined distance (in C1), a communication link is established with the field device F1. In this process, a field device symbol on the operator interface B1 can change its color, e.g., to green, and/or a tone sequence can change. In a step C6, the operator can use the communication link for measured value transmission, control, diagnostics, parameterization, and/or for transmitting further data from and to the field device F1. In a step C7, after completion of the operation, the communication link can be disconnected, e.g., manually. Steps C3 to C7 or C1 to C7 may be performed repeatedly. For example, the operator can select another field device F2 to be found.

LIST OF REFERENCE SIGNS

10 Fabrication area
20 Radio room
30 Display
35 Direction
38 Devices
40 Flowchart
41-43 Steps of the flow chart 40
50 Flowchart
C1-C7 Steps of flowchart 50
B1-B3 Operator(s)
F1-F7 Field device(s)
W1-W7 Paths

The invention claimed is:

1. A method for locating a field device having a wireless interface, comprising the steps of:
   transmitting, from the field device, identification information including distance information and direction information;
   receiving, by an operator device, the identification information, wherein the operator device establishes a communication link with the field device when the distance falls below a predefined distance, the predefined distance being selectable by an operator; and
   displaying, by the operator device, based on the identification information, a distance, and a direction of the field device with respect to the operator device.

2. The method according to claim 1,
   wherein the distance and the direction of the field device are updated periodically and/or upon a movement of the operator device.

3. The method according to claim 1,
   wherein the wireless interface supports a near-field communication Angle of Arrival (AoA) protocol and/or a near-field communication Real Time Localization (RTLS).

4. The method according to claim 1,
   where the distance and the direction are indicated visually and/or acoustically.

5. The method according to claim 1,
   wherein the distance and the direction are combined with
   a map of the environment, and/or
   a minimum path between the field device and the operating device is determined.

6. The method according to claim 1,
   wherein the distance and the direction are indicated by a virtual reality display and/or augmented reality display.

7. The method according to claim 1,
   wherein the field device further transmits a visual and/or acoustic signal.

8. The method according to claim 1,
   wherein the operator device establishes a communication link with the field device after a transmission of an optical signal.

9. The method according to claim 1,
   wherein the communication link is established using a secured protocol and/or an optical signal of the field device.

10. The method according to claim 8,
    wherein the communication link is established using a secured protocol and/or an optical signal of the field device.

11. The method according to claim 1,
    wherein the communication link is configured to transmit a measured value, to control, to diagnose, to parameterize, and/or to transmit further data from and to the field device.

12. The method according to claim 8,
    wherein the communication link is configured to transmit a measured value, to control, to diagnose, to parameterize, and/or to transmit further data from and to the field device.

13. The method according to claim 9,
    wherein the communication link is configured to transmit a measured value, to control, to diagnose, to parameterize, and/or to transmit further data from and to the field device.

14. The method according to claim 1, wherein a plurality of field devices each transmit identification information, further comprising the steps of:
    indicating the plurality of field devices, each of which transmits identification information; and
    selecting, by the operator device, based on the identification information, the field device from the plurality of field devices.

15. A nontransitory computer-readable storage medium comprising computer program instructions stored therein, which, when executed on a processor of a field device or an operator device, instructs the processor or the field device or the operator device to perform the corresponding steps of the method according to claim 1.

16. An operator device, configured to carry out the steps of a method according to claim 1.

17. The operator device according to claim 16, wherein the operator device is further configured to locate a field device having a wireless interface.

18. A field device, configured to perform the steps of a method according to claim 1.

19. The field device according to claim 18, the field device being further configured for level measurement, for topology determination, for level limit determination, for flow measurement, for pressure measurement, for temperature measurement, and/or for display of measured values.

* * * * *